US008780682B2

(12) United States Patent
Madison et al.

(10) Patent No.: US 8,780,682 B2
(45) Date of Patent: *Jul. 15, 2014

(54) ROTARY HEAD DATA STORAGE AND RETRIEVAL SYSTEM AND METHOD FOR DATA ERASURE (71) Applicant: Oracle International Corporation, Redwood City, CA (US)

(72) Inventors: Carl Madison, Windsor, CO (US); Timothy C. Ostwald, Boulder, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,744

(22) Filed: Nov. 7, 2012

(65) Prior Publication Data
US 2014/0126343 A1 May 8, 2014

(51) Int. Cl.
*G11B 20/18* (2006.01)
(52) U.S. Cl.
USPC ........................................ 369/53.31; 720/658
(58) Field of Classification Search
USPC .......... 360/53; 369/53.31, 53.1, 53.11, 47.53, 369/53.44; 720/658
See application file for complete search history.

(56) References Cited

U.S. PATENT DOCUMENTS

| 2,866,012 | A |   | 12/1958 | Ginsburg et al. |
| 4,970,707 | A |   | 11/1990 | Hara et al. |
| 5,331,490 | A |   | 7/1994 | Richards et al. |
| 5,343,338 | A |   | 8/1994 | Murata et al. |
| 5,404,348 | A | * | 4/1995 | Terao et al. .................... 369/116 |
| 5,450,228 | A |   | 9/1995 | Boardman et al. |
| 5,465,243 | A |   | 11/1995 | Boardman et al. |
| 5,519,554 | A |   | 5/1996 | Todd et al. |
| 5,585,978 | A |   | 12/1996 | Rottenburg et al. |
| 5,646,806 | A |   | 7/1997 | Griffith et al. |
| 5,883,868 | A | * | 3/1999 | Iwanaga ..................... 369/53.31 |
| 5,889,744 | A | * | 3/1999 | Iwanaga ..................... 369/53.31 |
| 5,953,482 | A | * | 9/1999 | Suzuki et al. ................. 386/237 |
| 6,061,199 | A |   | 5/2000 | Goker et al. |

(Continued)

FOREIGN PATENT DOCUMENTS

| DE | 2022265 | 11/1971 |
| DE | 2203840 | 8/1973 |

(Continued)

OTHER PUBLICATIONS

Quadruplex videotape, Wikipedia.org, Mar. 30, 2011, pp. 1-3.

(Continued)

*Primary Examiner* — Brenda Bernardi
(74) *Attorney, Agent, or Firm* — Brooks Kushman P.C.

(57) ABSTRACT

A data storage and retrieval system includes a head carriage unit adapted for rotational motion and having multiple heads disposed at a working surface, the head carriage unit adapted for rotational motion. The system also includes a tape drive unit configured to move a tape media past the working surface of the head carriage unit, the tape media having a width approximately equal to a width of the working surface of the head carriage unit. As the head carriage unit rotates and the tape moves past the working surface, a first head is configured to write a data track on the tape and a second head is configured to thereafter read the data track, where data read by the second head is for use in verifying data erasure.

20 Claims, 3 Drawing Sheets

(56) References Cited

U.S. PATENT DOCUMENTS

| | | |
|---|---|---|
| 6,075,678 A | 6/2000 | Saliba |
| 6,075,759 A | 6/2000 | Yanagawa et al. |
| 6,088,183 A | 7/2000 | Nelson |
| 6,108,165 A | 8/2000 | Maruyama et al. |
| 6,141,312 A | 10/2000 | Masters et al. |
| 6,188,535 B1 | 2/2001 | Lemke et al. |
| 6,285,519 B1 | 9/2001 | Goker |
| 6,297,927 B1 | 10/2001 | Rudi |
| 6,304,397 B1 | 10/2001 | Ozue et al. |
| 6,442,126 B1 | 8/2002 | Marchant et al. |
| 6,614,731 B2 | 9/2003 | Ishii |
| 6,661,616 B2 | 12/2003 | Yasukochi |
| 6,856,484 B2 | 2/2005 | Johnson et al. |
| 6,940,682 B2 | 9/2005 | Bui et al. |
| 7,050,265 B2 | 5/2006 | Kondo et al. |
| 7,062,682 B2 * | 6/2006 | Ozaki ............... 714/42 |
| 7,133,262 B1 | 11/2006 | Nayak |
| 7,324,297 B2 | 1/2008 | Evans et al. |
| 8,014,246 B2 | 9/2011 | Mahnad |
| 8,077,566 B2 * | 12/2011 | Mahnad ............ 369/47.14 |
| 8,174,950 B2 | 5/2012 | Ritter et al. |
| 8,225,339 B1 | 7/2012 | Madison, Jr. et al. |
| 2003/0043498 A1 | 3/2003 | Johnson et al. |
| 2007/0047395 A1 | 3/2007 | Skeeter et al. |
| 2007/0143659 A1 | 6/2007 | Ball |
| 2007/0206477 A1 | 9/2007 | Raniuk et al. |
| 2007/0222096 A1 | 9/2007 | Slafer |
| 2011/0141863 A1 | 6/2011 | Mahnad |
| 2013/0235708 A1 | 9/2013 | Wilson |

FOREIGN PATENT DOCUMENTS

| | | | |
|---|---|---|---|
| JP | 06-290401 | 10/1994 | |
| JP | 07-098828 | 4/1995 | |
| WO | WO 9202014 A1 * | 2/1992 | ............ G11B 5/265 |
| WO | WO 02/09099 | 1/2002 | |
| WO | 2007092785 A2 | 8/2007 | |
| WO | 2007092785 | 12/2008 | |

OTHER PUBLICATIONS

Optical Disc Drive, Wikipedia.org, Mar. 30, 2011, pp. 1-4.
Helical scan, Wikipedia.org, Feb. 2, 2009, pp. 1-2.
Blu-ray disc, Wikipedia.org, Mar. 29, 2011, pp. 1-10.
International Search Report for PCT/US2012/041996 dated Oct. 25, 2012.
Office Action for U.S. Appl. No. 13/670,688 dated Oct. 23, 2013.
Office Action for U.S. Appl. No. 13/670,712 dated Oct. 4, 2013.
Office Action for U.S. Appl. No. 13/622,607 dated Sep. 12, 2013.
International Search Report and Written Opinion for International Application PCT/US2013/088646 dated Feb. 24, 2014 (13 pages total).
European Patent Office, International Search Report and the Written Opinion for Internatonal Application No. PCT/USA2013/068489 mailed Feb. 26, 2014.
European Patent Office, International Search Report and the Written Opinion for International Application No. PCT/US2013/068660 mailed Feb. 26, 2014.
Office Action for U.S. Appl. No. 14/127,028 dated Apr. 7, 2014.
European Patent Office, The International Searching Authority, The International Search Report for PCT/US2013/068660 mailed Feb. 25, 2014.
European Patent Office, The International Searching Authority, The International Search Report for PCT/US2013/068489 mailed Feb. 26, 2014.
Final Office Action for U.S. Appl. No. 13/670,712 dated Apr. 25, 2014.
United States Patent and Trademark Office, Notice of Allowance and Fee(s) Due for U.S. Appl. No. 13/670,688 mailed Mar. 14, 2014.
Office Action for U.S. Appl. No. 13/622,607 dated May 7, 2014.

* cited by examiner

ROTARY HEAD DATA STORAGE AND RETRIEVAL SYSTEM AND METHOD FOR DATA ERASURE

TECHNICAL FIELD

The following relates to a system and method for data storage and retrieval utilizing a tape medium and a rotary head and providing for data erasure.

BACKGROUND

Magnetic and optical tape media are frequently used for long-term storage of large quantities of data, such as in data backup or archive operations. Typical tape data storage and retrieval methods involve recording or writing data in tracks running length-wise down the tape, as well as retrieving or reading such data tracks from the tape. A multiple stripe head is used to write and/or read many parallel tracks. Magnetic heads may have more than 96 tracks with the ability to jog along the width of a magnetic tape to write and/or read more tracks. Optical tape data storage and retrieval systems using laser heads operate in a similar fashion.

The multiple stripe head designs mentioned above become inefficient as tape length is increased for greater capacity, such as in archive operations, because of the increased time it takes to access the data stored at the end of the tape. While shorter tapes result in quicker access time than longer tapes, shorter tape lengths also result in more limited storage capacity, thereby hindering archive operations where large data quantities are involved. A wide tape to boost capacity requires many more transducers in the head. Data throughput is also a factor of tape width and the number of heads. Limits to multiple stripe head designs include the number of read and write heads and overall tape width.

Problems arise in data recording when a large volume of data needs to be erased. In magnetic recording, this can be done through bulk erasure by a strong magnetic field. Magnetic recorders can also use a write operation for each data bit to ensure a random or blank pattern, although this can be time consuming. An optical recorder using phase-change media is not capable of bulk data erase methods, and a re-writing of random or blank bits would again be time consuming.

Performance of erasure methods in magnetic tape is also hindered by data security requirements, which may mandate a read-after erase cycle to verify erasure. Indeed, such requirements may go to extreme lengths to make sure data is removed. Repeated erase cycles may be required up to seven times to meet strict security standards. When data is written to a storage medium in bulk erasure methods, is necessary to read back the information in order to verify erasure by verifying data integrity. Typical optical recorders (DVD, etc) are not designed to perform this function, as the phase change media is not easily read back using a single laser element.

Thus, there exists a need for an improved tape media data storage system and method. Such a system and method would include a rotary head design, wherein multiple head elements available on a rotating head carriage assembly can be used to perform bulk data erasure. Existing write heads would be utilized in a read mode in order to do so without requiring additional dedicated read heads.

SUMMARY

According to one embodiment disclosed herein, a data storage and retrieval system is provided. The system comprises a head carriage unit having a plurality of optical heads disposed at a working surface, the head carriage unit adapted for rotational motion. The system further comprises a tape drive unit configured to move an optical tape media past the working surface of the head carriage unit.

As the head carriage unit rotates and the tape moves past the working surface, a first one of the plurality of optical heads is configured to write a data track on the tape and a second one of the plurality of optical heads is configured to thereafter read the data track. Data read by the second optical head is for use in verifying data erasure According to another embodiment disclosed herein, a data storage and retrieval system is provided. The system comprises a head carriage unit having a plurality of heads disposed at a working surface, the head carriage unit adapted for rotational motion. The system further comprises a tape drive unit configured to move a tape media past the working surface of the head carriage unit, the tape media having a width approximately equal to a width of the working surface of the head carriage unit.

As the head carriage unit rotates and the tape moves past the working surface, a first one of the plurality of heads is configured to overwrite a data track on the tape and a second one of the plurality of heads is configured to thereafter read the data track. Data read by the second head is for use in verifying data erasure.

According to still another embodiment disclosed herein, a data storage and retrieval method is provided. The method comprises rotating a head carriage unit having a plurality of optical heads disposed at a working surface, and moving the tape past the working surface of the head carriage unit. The method further comprises writing a data track on an optical tape media using a first one of the plurality of optical heads as the head carriage unit rotates and the tape moves past the working surface, and reading the data track using a second one of the plurality of optical heads as the head carriage unit rotates and the tape moves past the working surface, wherein data read by the second optical head is for use in data erasure verification.

A detailed description of these embodiments and accompanying drawings is set forth below.

DETAILED DESCRIPTION

With reference to FIGS. 1-4, a data storage and retrieval system and method utilizing a tape media and a rotary head will be described. For ease of illustration and to facilitate understanding, like reference numerals have been used herein for similar components and features throughout the drawings.

As previously described, magnetic and optical tape media are frequently used for long-term storage of large quantities of data, such as in data backup or archive operations. Typical tape data storage and retrieval methods involve recording or writing data in tracks running length-wise down the tape, as well as retrieving or reading such data tracks from the tape. A multiple stripe head is used in magnetic tape storage and retrieval systems to write and/or read many parallel tracks, with the head having the ability to jog along the width of the tape to write and/or read more tracks. Optical tape storage and retrieval systems using laser heads operate in a similar fashion.

Multiple stripe head designs become inefficient, however, as tape length is increased for greater capacity because of the increased time it takes to access the data stored at the end of the tape. Shorter tape lengths result in quicker access time than longer tape lengths, but also result in more limited data storage capacity. A wide tape to boost capacity requires many more transducers in the head. Data throughput is also a factor of tape width and the number of heads. Limits to multiple stripe head designs include the number of heads and overall tape width.

The need to erase a large volume of data gives rise to various problems in data recording systems and methods. In magnetic recording, erasure of a large volume of data can be done through bulk erasure by a strong magnetic field. Magnetic recorders can also use a write operation for each data bit to ensure a random or blank pattern, although this can be time consuming. An optical recorder using phase-change media is not capable of bulk data erase methods, and a re-writing of random or blank bits would again be time consuming.

Data security requirements which mandate a read-after erase cycle to verify erasure also hinder performance of data erasure methods in magnetic tape. Indeed, such requirements may go to extreme lengths to make sure data is removed. Repeated erase cycles may be required up to seven times to meet strict security standards. When data is written to a storage medium in bulk erasure methods, is necessary to read back the information in order to verify erasure by verifying data integrity. Typical optical recorders (DVD, etc) are not designed to perform this function, as the phase change media is not easily read back using a single laser element.

An improved tape media data storage system and method as disclosed herein include a rotary head design, wherein multiple head elements available on a rotating head carriage assembly can be used to perform bulk data erasure. Existing write heads are utilized in a read mode in order to do so without requiring additional dedicated read heads. With write elements also functioning as read elements, cost and complexity savings are achieved and strict data security requirements can be met.

Figure 1:
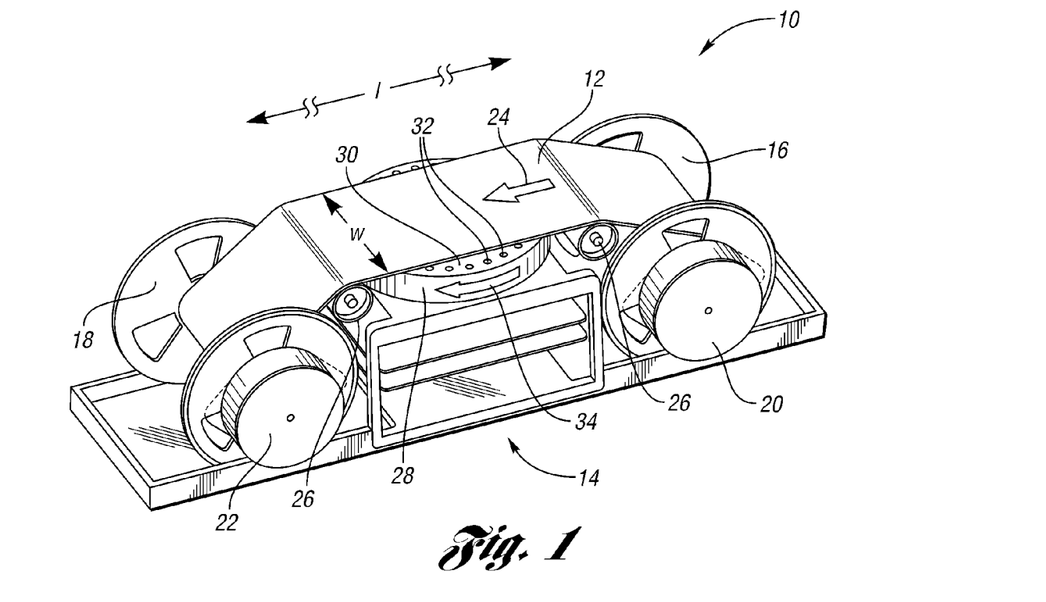
FIG. 1 is a perspective view of an embodiment of the data storage and retrieval system disclosed herein.

Referring now to FIG. 1, a perspective view of an embodiment of the data storage and retrieval system disclosed herein is shown. The system 10 comprises tape drive unit and a head carriage unit. The tape drive unit comprise a tape media 12, which may be an optical tape, and a supporting servo drive system 14. The tape media 12 may be supplied on a supply reel 16 and can be transferred to a take-up reel 18 by servo action of a supply reel drive motor 20 and take-up reel drive motor 22. The two motors 20, 22 may act in unison to provide smooth movement of the tape 12 along a tape path.

As can be seen in FIG. 1, the tape media 12 has a width (w) as well as a length (l) stretching from respective ends of the tape 12, which ends are attached (not shown) to the supply and take-up reels 16, 18. The tape 12 travels in a direction shown by arrow 24 along the tape path. The tape path has a series of guide rollers 26, which help to provide control of the tape 12 as it is driven past a head assembly 28. A servo control system (not shown) may be used to provide closed loop motion control for the tape 12 and accurately control the tape tension and position with respect to the head assembly 28.

As also seen in FIG. 1, the head assembly 28 may be substantially disc-shaped, including a substantially circular and substantially planar working surface 30 proximate the tape media 12. The head assembly 28 may include multiple heads 32 for recording and/or reading data to and/or from the tape media 12. In that regard, the head assembly 28 rotates during operation in a direction shown by arrow 34 as the tape media 12 moves in a direction shown by arrow 24. The rotary head data storage and retrieval system of FIG. 1 is further described, together with additional features, components, operations, functions and methods, in U.S. Pat. No. 8,225,339 and U.S. patent application Ser. No. 13/622,607, the disclosures of which are incorporated herein by reference in their entireties.

Figure 2:
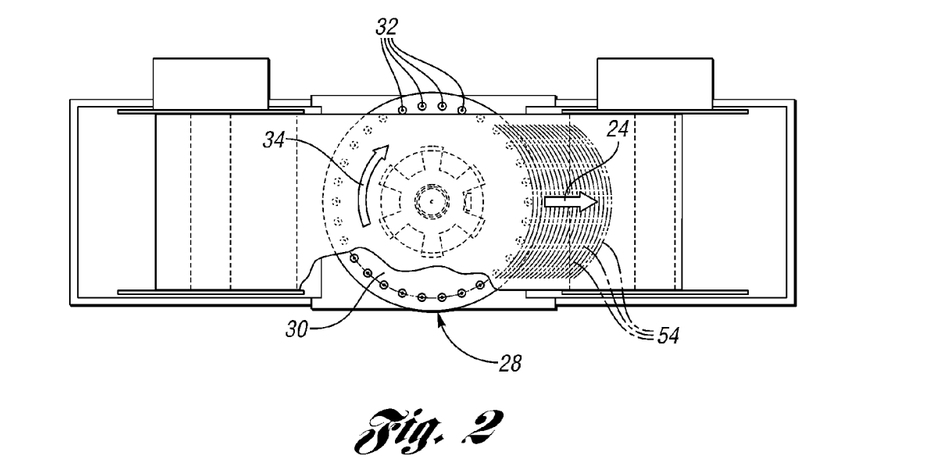
FIG. 2 is a top view of an embodiment of the data storage and retrieval system disclosed herein.
Figure 3:
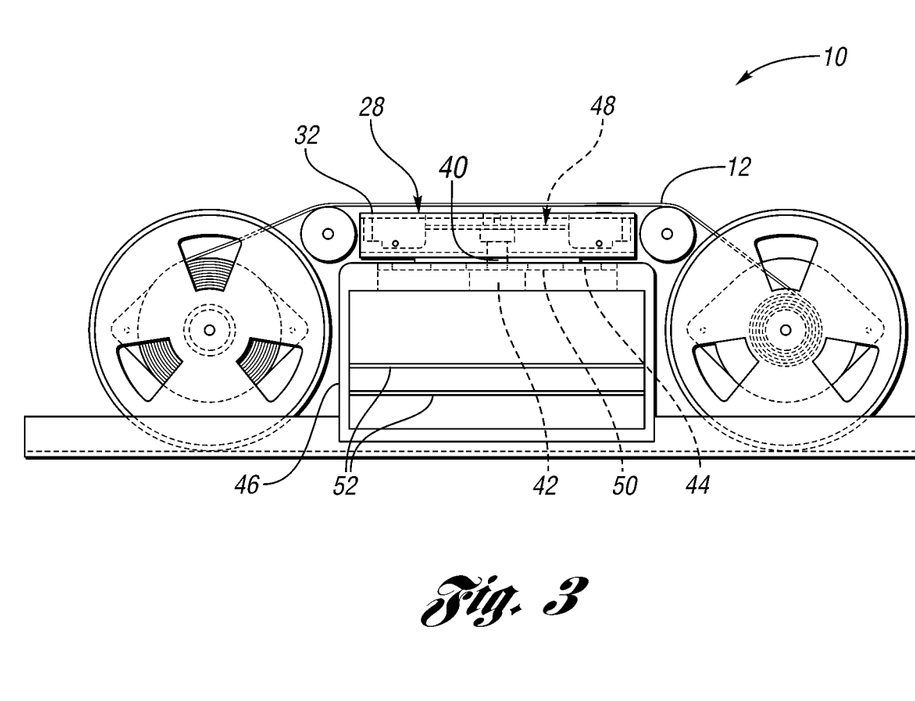
FIG. 3 is a side view of an embodiment of the data storage and retrieval system disclosed herein.

Referring next to FIGS. 2 and 3, top and side views of an embodiment of the data storage and retrieval system disclosed herein are shown. As seen therein, the head assembly 28 may be built upon a head carriage unit. The carriage unit may hold multiple Optical Pickup Unit (OPU) laser assemblies 32, which perform the actual writing/reading or recording/retrieval of data to/from an optical tape 12. While a particular number of OPUs 32 are illustrated in FIG. 2, any number of OPU assemblies 32 may be used. As well, OPUs 32 may be similar assemblies as those used in Blu-Ray disc drives.

As seen in FIG. 2, the OPU assemblies 32 may be located radially on the rotating head carriage 28 at a fixed radius in a substantially circular pattern. Such positioning of the OPU assemblies 32 can ensure that as the head assembly 28 rotates in the direction shown by arrow 34 and the tape 12 moves in the direction shown by arrow 24, the optical beams from each OPU 32' transcribe substantially equal radius arcs onto the tape media 12.

The rotatable head assembly 28 may be mounted underneath the tape media 12. A spindle shaft 40 may be provided for support of the rotatable head assembly 28. The head assembly 28 may be driven to rotate by a head drive motor 42, which may be built into the head assembly 28. In that regard, passive rotor magnets 44 associated with the rotating head assembly 28 may be driven by commutation of stator coils (not shown) fixed in the tape drive base 46.

Referring to FIG. 3, a head assembly circuit board 48 may be provided to control the function of OPU assemblies 32, as well as data communication. Power may be supplied to the head circuitry 48 through an inductive coupling 50. Data signals to and from the OPU assemblies 32 may be sent through the inductive coupling 50. Motor control and further data signal processing may be performed by circuit boards 52, which may be located in the tape drive base 46.

Still referring to FIG. 3, the tape media 12 travels in a path that passes over the head assembly 28 in the direction shown by arrow 24. The head assembly 28 also rotates in the direction illustrated by arrow 34. The passage of optical beams from each OPU 32 past the tape media 12 may transcribe data tracks of recorded spots in substantially similar approximate arcs 54 on the tape media 12. The arcs 54 are only approximate in radius in that the movement of the tape media 12 past the heads 32 will skew the data tracks recorded from true arcs to elongated arcs 54 in proportion to the speed of the rotating heads 32 and the speed of the moving tape 12.

A servo control method and system (not shown) may also be provided to control the speed of the tape media 12 in such a way that the rotating laser spots from OPU assemblies 38 will individually write data tracks 54 with spacing set apart from one another as a function of the velocities of the tape media 12 and the rotating head assembly 28. In that regard, the relative speeds between tape media 12 and head assembly 28 can be large, with the speed of the head assembly 28 emulating the recording speed of a Blu-Ray DVD, while the speed of the tape media 12 can be quite slow. As a result, by moving both the tape media 12 and the recording heads 32, the data storage system and method disclosed herein having a rotating head assembly 28 may provide for very high data rates and very large storage capacity.

As previously noted, the head carriage assembly 28 may be substantially disc-shaped, and may include a substantially circular and substantially planar working surface 30 proximate the tape media 12. It should be noted, however, that the head assembly 28 and working surface 30 may have different shapes and/or configurations. As well, OPU assemblies 32 may comprise servo subsystems for controlling movement of the OPUs 32 relative to the tape medium 12 and the head carriage assembly 28, including radial movement of the OPUs 32 at the working surface 30 of the head carriage assembly 28.

According to the system 10 and method disclosed herein, each OPU 32 may be used in a read-after-write mode to verify data integrity. That is, each OPU 32 may operate to both write data to and read data from the tape medium 12. In such a fashion, the rotary head assembly 28 with multiple laser OPUs 32 takes advantage of consecutive active OPUs 32 to read a data track immediately after the data track has been written to the tape medium 12. The rotating OPUs 32 are also thus capable of writing over each other on the same data track 54 in consecutive operations in a single pass of the rotary head assembly 28 past the tape media 12.

In such a fashion, the rotating head assembly 28 utilizes multiple OPUs 32 in write/read operations to the tape media 12, thereby enabling multiple write-read cycles in a single pass of the head assembly 28 across the tape 12 (e.g., seven or more write/read cycles to thereby meet strict data security requirements associated with bulk data erasure). The system 10 and method disclosed herein also provide improved data-erase performance over stationary recording methods.

More particularly, referring now to FIGS. 1 and 2, in one embodiment disclosed herein, a first OPU 32 may write or overwrite a first character (which may be random) to a data track 54 on the tape media 12, a second OPU 32 immediately following behind the first OPU 32 may read that data back, a third OPU 32 may then write or overwrite another character (which may be random) in the same spot on the data track 54, and a fourth OPU 32 may read that data back to verify integrity and thus verify data erasure. The rotation of the head assembly 28 and OPUs 32 enables such operation in a single swipe or rotation of the head assembly 28 while the media 12 is slowly passed over the head assembly 28. It should again be noted that each OPU 32 utilizes track following servo motors (not shown) to stay in the required data track 54.

Referring now to FIGS. 1-3, as previously described, a head carriage unit 28 adapted for rotational motion may comprise a plurality of heads 32 disposed at a working surface 30. A tape drive unit configured to move a tape media 12 past the working surface 30 of the head carriage unit 28, and the tape media 12 may have a width (w) approximately equal to a width of the working surface 30 of the head carriage unit 28. As the head carriage unit 28 rotates and the tape 12 moves past the working surface 30, a first one of the plurality of heads may be adapted, configured and/or positioned to write or overwrite a data track 54 on the tape 12 and a second one of the plurality of heads 32 may be adapted, configured and/or positioned to thereafter read the data track 54. Data read by the second head 32 is for use in verifying data erasure.

As previously described, the plurality of heads 32 may comprise optical heads, the tape media 12 may comprise an optical tape, and each of the plurality of optical heads 32 may be adapted, configured and/or positioned to write data tracks 54 to and read data tracks 54 from the optical tape 12. The head carriage unit 28 may be substantially disc shaped, the working surface 30 may be substantially circular, and the plurality of heads 32 may be arrayed in a circle on the working surface 30. The second one of the plurality of heads 32 may be located on the working surface 30 immediately adjacent the first one of the plurality of heads 32, and each of the plurality of heads 32 may be configured for radial movement with respect to the head carriage unit 28 at the working surface 30, such as by a servo subsystem.

It should be noted, however, that the second head 32 adapted, configured and/or positioned to read the data track 54 after the data track 54 has been written need not be located on the working surface immediately adjacent the first head 32. In that regard, the second head 32 adapted, configured and/or positioned to read the data track 54 may be any other head 32 following the first head 32 adapted, configured and/or positioned to write the data track 54 as the head assembly 28 rotates. That is, a third, fourth or any other head 32 after the head 32 adapted, configured and/or positioned to write the data track 54 may be utilized to thereafter read the data track 54 for use in verifying data erasure. As well, multiple heads 32 may be utilized to read the data track 54, redundantly, after the data track 54 has been written by the first head 32.

As also previously described, as the head carriage unit 28 rotates and the tape 12 moves past the working surface 30, a third one of the plurality of heads 32 may be adapted, configured and/or positioned to write the data track 54 on the tape 12 and a fourth one of the plurality of heads 32 may be adapted, configured and/or positioned to thereafter read the data track 54. In such an embodiment, data read by the fourth head 54 may again be for use in verifying data erasure. Here again, it should be noted that any number or combination of subsequent heads 32, located adjacent to each other at the working surface 30 or otherwise, may be used to write data to the data track 54 on the tape 12 and thereafter read the data track 54, wherein the data read is for use in verifying data erasure.

The plurality of heads 32 at the working surface 30 may alternatively comprise first and second concentric circles of heads 32, the first circle having a diameter less than a diameter of the second circle. The first one of the plurality of heads 32 adapted, configured and/or positioned to write a data track 54 may be located in the first circle of heads 32, and the second one of the plurality of heads 32 adapted, configured and/or positioned to read the data track 54 after the data track 54 has been written may be located in the second circle of heads 32. The tape media 12 may have a width (w) less than a diameter of the circle of the plurality of heads 32, or alternatively may have a width (w) greater than a diameter of the circle of the plurality of heads 32.

Figure 4:
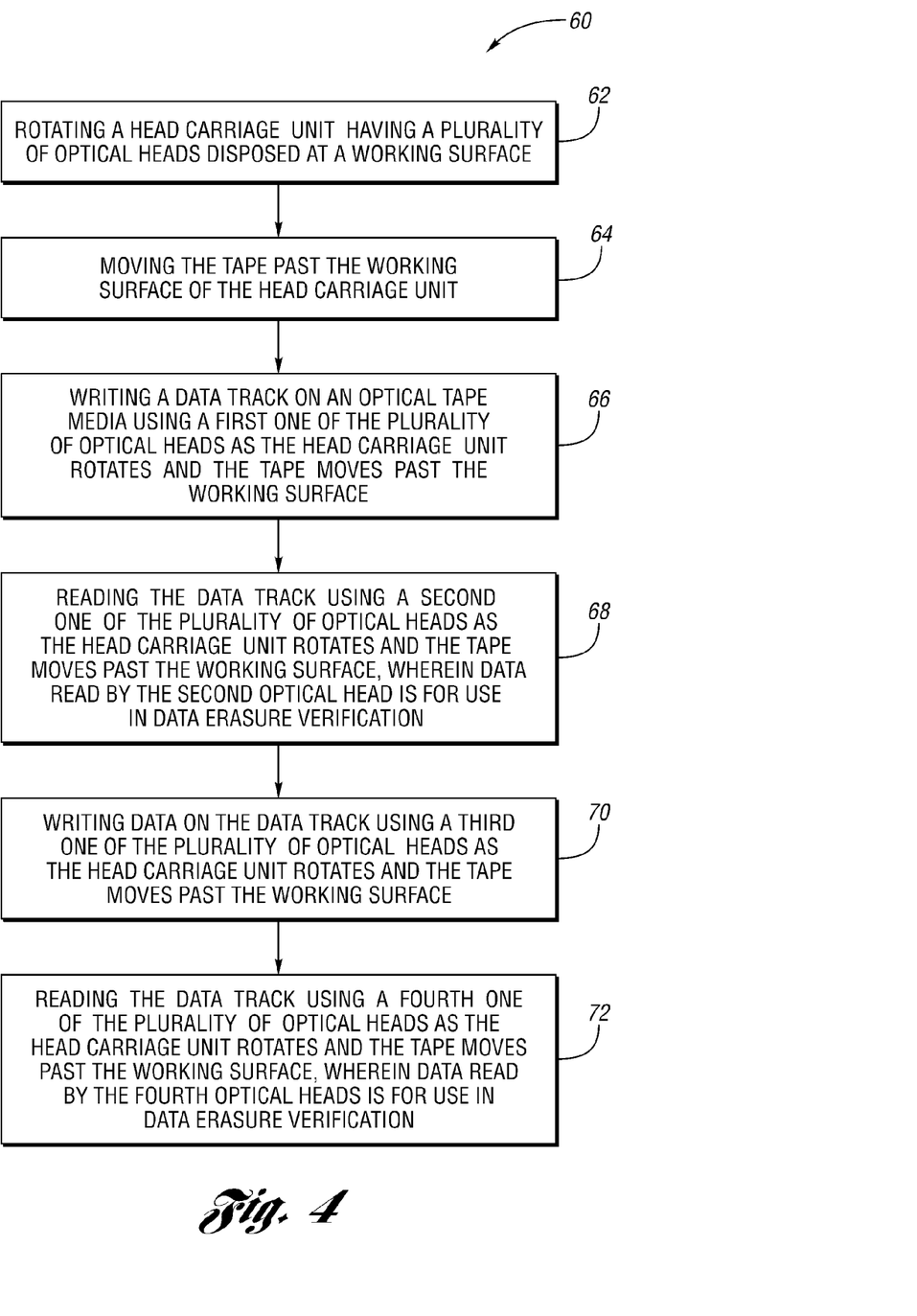
FIG. 4 is a simplified flowchart depicting an embodiment of the data storage and retrieval method disclosed herein.

Referring next to FIG. 4, simplified flowchart of an embodiment of the data storage and retrieval method 60 disclosed herein is shown. As seen therein, the method 60 may comprise rotating 62 a head carriage unit having a plurality of optical heads disposed at a working surface, and moving 64 the tape past the working surface of the head carriage unit. The method 60 may further comprise writing 66 a data track on an optical tape media using a first one of the plurality of optical heads as the head carriage unit rotates and the tape moves past the working surface. In that regard, writing 66 data on the data track using a first one of the plurality of optical heads may comprise overwriting data on the data track using the first one of the plurality of optical heads. The method 60 may still further comprises reading 68 the data track using a second one of the plurality of optical heads as the head carriage unit rotates and the tape moves past the working surface, wherein data read by the second optical head is for use in data erasure verification.

Once again, as described previously in connection with FIGS. 1-3, according to an embodiment of the data storage method disclosed herein, the head carriage unit 28 may be substantially disc shaped, the working surface 30 may be substantially circular, and the plurality of heads 32 may be arrayed in a circle on the working surface 30. The second one of the plurality of heads 32 may be located on the working surface 30 immediately adjacent the first one of the plurality of heads 32, and each of the plurality of heads 32 may be configured for radial movement with respect to the head carriage unit 28 at the working surface 30, such as by a servo subsystem.

Still referring to FIG. 4, in one embodiment disclosed herein, the method 60 may further comprise writing 70 data on the data track using a third one of the plurality of optical heads as the head carriage unit rotates and the tape moves past the working surface. In that regard, writing 70 data on the data track using a third one of the plurality of optical heads may comprise overwriting data on the data track using the third one of the plurality of optical heads. The method 60 may still further comprise reading 72 the data track using a fourth one of the plurality of optical heads as the head carriage unit rotates and the tape moves past the working surface. In such an embodiment, data read by the fourth optical head may be for use in data erasure verification. In this embodiment, the third one of the plurality of optical heads may located on the working surface immediately adjacent the second one of the plurality of optical heads, and the fourth one of the plurality of optical heads may be located on the working surface immediately adjacent the third one of the plurality of optical heads.

As also described above in connection with FIGS. 1-3, according to the data storage method 60 disclosed herein, each of the plurality of heads may be adapted, configured and/or positioned for radial movement with respect to the head carriage unit at the working surface, such as by a servo subsystem. Alternatively, the plurality of heads 32 at the working surface 30 may comprise first and second concentric circles of heads 32, the first circle having a diameter less than a diameter of the second circle. The first one of the plurality of heads 32 adapted, configured and/or positioned to write a data track 54 may be located in the first circle of heads 32, and the second one of the plurality of heads 32 adapted, configured and/or positioned to read the data track 54 after the data track 54 has been written may be located in the second circle of heads 32. The tape media may have a width (w) less than or greater than a diameter of the circle of the plurality of optical heads 32.

As is apparent from the foregoing description, an improved tape media data storage and retrieval system and method having a rotary head design is provided. Multiple head elements available on a rotating head carriage assembly may be used to perform bulk data erasure. Existing write heads are utilized in a read mode in order to do so without requiring additional dedicated read heads. With write elements also functioning as read elements, cost and complexity savings are achieved while meeting strict data security requirements.

While certain embodiments of a data storage and retrieval system and method utilizing a tape media and a rotary head have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A data storage and retrieval system comprising:
a head carriage unit having a plurality of optical heads disposed at a working surface, the head carriage unit adapted for rotational motion about a point and each of the plurality of heads configured for radial movement at the working surface relative to the point; and
a tape drive unit configured to move an optical tape media past the working surface of the head carriage unit;
wherein, when the head carriage unit rotates and the tape moves past the working surface, a first one of the plurality of optical heads is configured to write a data track on the tape and a second one of the plurality of optical heads is configured to thereafter read the data track, wherein data read by the second optical head is used in verifying data erasure.

2. The system of claim 1 wherein each of the plurality of optical heads is configured to write data tracks to and read data tracks from the optical tape media.

3. The system of claim 1 wherein the head carriage unit is substantially disc shaped, the working surface is substantially circular, and the plurality of heads are arrayed in substantially a circle on the working surface.

4. The system of claim 3 wherein the second one of the plurality of optical heads is located on the working surface immediately adjacent the first one of the plurality of optical heads.

5. The system of claim 4 wherein, as the head carriage unit rotates and the tape moves past the working surface, a third one of the plurality of optical heads is configured to write the data track on the tape and a fourth one of the plurality of optical heads is configured to thereafter read the data track, wherein data read by the fourth optical head is for use in verifying data erasure.

6. The system of claim 3 wherein the tape media has a width less than a diameter of the circle of the plurality of optical heads.

7. The system of claim 3 wherein the tape media has a width greater than a diameter of the circle of the plurality of optical heads.

8. A data storage and retrieval system comprising:
a head carriage unit having a plurality of heads disposed at a working surface, the head carriage unit adapted for rotational motion about a point and each of the plurality of heads configured for radial movement at the working surface relative to the point; and
a tape drive unit configured to move a tape media past the working surface of the head carriage unit, the tape media having a width approximately equal to a width of the working surface of the head carriage unit;
wherein, when the head carriage unit rotates and the tape moves past the working surface, a first one of the plurality of heads is configured to overwrite a data track on the tape and a second one of the plurality of heads is configured to thereafter read the data track, wherein data read by the second head is used in verifying data erasure.

9. The system of claim 8 wherein the plurality of heads comprise optical heads and the tape media comprises optical tape, and wherein each of the plurality of optical heads is configured to write data tracks to and read data tracks from the optical tape.

10. The system of claim 8 wherein the head carriage unit is substantially disc shaped, the working surface is substantially circular, and the plurality of heads are arrayed in substantially a circle on the working surface.

11. The system of claim 10 wherein the second one of the plurality of heads is located on the working surface immediately adjacent the first one of the plurality of heads.

12. The system of claim 11 wherein, as the head carriage unit rotates and the tape moves past the working surface, a third one of the plurality of heads is configured to write the data track on the tape and a fourth one of the plurality of heads is configured to thereafter read the data track, wherein data read by the fourth head is for use in verifying data erasure.

13. The system of claim 10 wherein the tape media has a width less than a diameter of the circle of the plurality of heads.

14. The system of claim 10 wherein the tape media has a width greater than a diameter of the circle of the plurality of heads.

15. A data storage and retrieval method comprising:
rotating a head carriage unit about a point, the head carriage unit having a plurality of optical heads disposed at a working surface;
moving the tape past the working surface of the head carriage unit;
writing a data track on an optical tape media using a first one of the plurality of optical heads as the head carriage unit rotates and the tape moves past the working surface; and
reading the data track using a second one of the plurality of optical heads as the head carriage unit rotates and the tape moves past the working surface, wherein data read by the second optical head is used in data erasure verification, and wherein reading and/or writing comprises radially moving an optical head relative to the point.

16. The method of claim 15 wherein the head carriage unit is substantially disc shaped, the working surface is substantially circular, the plurality of heads are arrayed in substantially a circle on the working surface, the second one of the plurality of optical heads is located on the working surface immediately adjacent the first one of the plurality of optical heads, and each of the plurality of optical heads is configured for radial movement at the working surface relative to the point.

17. The method of claim 16 further comprising:
writing data on the data track using a third one of the plurality of optical heads as the head carriage unit rotates and the tape moves past the working surface; and
reading the data track using a fourth one of the plurality of optical heads as the head carriage unit rotates and the tape moves past the working surface, wherein data read by the fourth optical heads is for use in data erasure verification;
wherein the third one of the plurality of optical heads is located on the working surface immediately adjacent the second one of the plurality of optical heads, and the fourth one of the plurality of optical heads is located on the working surface immediately adjacent the third one of the plurality of optical heads.

18. The method of claim 17 wherein writing data on the data track using a first one of the plurality of optical heads comprises overwriting data on the data track using the first one of the plurality of optical heads, and wherein writing data on the data track using a third one of the plurality of optical heads comprises overwriting data on the data track using the third one of the plurality of optical heads.

19. The method of claim 16 wherein the tape media has a width less than a diameter of the circle of the plurality of optical heads.

20. The method of claim 16 wherein the tape media has a width greater than a diameter of the circle of the plurality of optical heads.

* * * * *

UNITED STATES PATENT AND TRADEMARK OFFICE
CERTIFICATE OF CORRECTION

| | | |
|---|---|---|
| PATENT NO. | : 8,780,682 B2 | |
| APPLICATION NO. | : 13/670744 | |
| DATED | : July 15, 2014 | |
| INVENTOR(S) | : Madison et al. | |

It is certified that error appears in the above-identified patent and that said Letters Patent is hereby corrected as shown below:

On title page 2, column 2, References Cited under Other Publications, line 13, delete "Internatonal" and insert -- International --, therefor.

In the Specification

Column 2, line 11, delete "erasure" and insert -- erasure. --, therefor.

Signed and Sealed this
Twenty-fourth Day of February, 2015

Michelle K. Lee
*Deputy Director of the United States Patent and Trademark Office*